(12) United States Patent
Kim et al.

(10) Patent No.: US 7,246,534 B2
(45) Date of Patent: **\*Jul. 24, 2007**

(54) DOUBLE CLUTCH TRANSMISSION

(75) Inventors: In Chan Kim, Yongin (KR); Tae Seok Seo, Suwon (KR)

(73) Assignee: Hyundai Motor Company, Yangjae-Dong, Seocho-Ku, Seoul (KR)

( * ) Notice: Subject to any disclaimer, the term of this patent is extended or adjusted under 35 U.S.C. 154(b) by 92 days.

This patent is subject to a terminal disclaimer.

(21) Appl. No.: 10/991,216

(22) Filed: Nov. 17, 2004

(65) Prior Publication Data

US 2005/0130795 A1    Jun. 16, 2005

(30) Foreign Application Priority Data

Dec. 10, 2003    (KR)  ............... 10-2003-0089621

(51) Int. Cl.
F16H 3/08    (2006.01)
(52) U.S. Cl. ............................................ 74/330
(58) Field of Classification Search ........... 74/330, 74/331
See application file for complete search history.

(56) References Cited

U.S. PATENT DOCUMENTS

| | | | | |
|---|---|---|---|---|
| 4,476,737 A | * | 10/1984 | Young | ............ 74/358 |
| RE33,336 E | * | 9/1990 | Bainbridge et al. | ............ 74/330 |
| 5,014,566 A | * | 5/1991 | Kashiwase | ............ 74/331 |
| 6,065,581 A | | 5/2000 | Nogle | |
| 6,427,549 B1 | * | 8/2002 | Bowen | ............ 74/331 |
| 6,427,550 B1 | * | 8/2002 | Bowen | ............ 74/336 R |
| 6,460,425 B1 | * | 10/2002 | Bowen | ............ 74/331 |
| 7,066,043 B2 | * | 6/2006 | Kim et al. | ............ 74/330 |

FOREIGN PATENT DOCUMENTS

| | | |
|---|---|---|
| DE | 1041370 C | 10/1958 |
| DE | 4447512 A1 | 3/1996 |
| DE | 19805303 A1 | 9/1998 |
| DE | 19860251 C1 | 11/2000 |
| DE | 10223226 A1 | 2/2003 |
| DE | 10153014 A1 | 5/2003 |
| DE | 10316070 A1 | 10/2003 |
| EP | 1124079 A2 | 8/2001 |

* cited by examiner

*Primary Examiner*—Dirk Wright
(74) *Attorney, Agent, or Firm*—Morgan Lewis & Bockius LLP

(57) ABSTRACT

Engine torque selectively inputted through first and second input shafts is received and changed selectively by first and second output devices respectively having first and second output shafts. A parking gear is disposed on one of the first and second output shafts in a transmission case at an axial position thereof corresponding to one drive gear engaged with one driven gear of another output shaft

23 Claims, 6 Drawing Sheets

DOUBLE CLUTCH TRANSMISSION

CROSS REFERENCE TO RELATED APPLICATIONS

This application claims priority of Korean Application No. 10-2003-0089621, file on Dec. 10, 2003, the disclosure of which is incorporated herein by reference.

FIELD OF THE INVENTION

Generally, the present invention relates to a double clutch transmission. More particularly, the present invention relates to a double clutch transmission having, in addition to a reduced length and enhanced power transmission efficiency, providing a reduced load on the parking apparatus by disposing a parking gear on an output shaft in a transmission case.

BACKGROUND OF THE INVENTION

Generally a double clutch transmission implies a transmission having two clutch devices therein. A double clutch transmission generally receives a torque input from an engine selectively at its two input shafts using two clutches, and it changes the torque and speed using gears on the two input shafts, and outputs them.

Such a double clutch transmission has been devised basically to compactly provide a multi-speed transmission having more than five speeds. The two clutches and synchronizing devices included in a double clutch transmission may be controlled by a controller, and accordingly, such a double clutch transmission may also realize an automated shift gear (ASG) that eliminates the necessity of manual shifting of a driver.

A clutch included in a double clutch transmission may be categorized as either a dry- or wet-type based on its operational scheme. A dry-type clutch utilizes the same principle as a clutch device conventionally disposed between an engine and a manual transmission. A wet-type clutch utilizes the same principle as a clutch device inside an automatic transmission.

A wet-type clutch generally has a higher torque capacity than a dry-type clutch. Therefore, for an engine of high output power, a wet-type clutch is appropriate. In order to stably transmit high output torque of a high powered engine, the widths of gears in the transmission should be large. Therefore, a double clutch transmission designed for a high torque engine may easily become very lengthy.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a double clutch transmission having non-limiting advantages of, in addition to reduced length and enhanced power transmission efficiency, a reduced load of a parking apparatus due to disposing a parking gear on an output shaft in a transmission case at a position axially corresponding to a drive gear engaged with a driven gear of another output shaft.

The present invention also provides a double clutch transmission having non-limiting advantages of a simplified linkage structure for transferring a movement of a shift lever (frequently called a transmission gear shift lever, and abbreviated as T.G.S lever) to the manual valve of a valve body by positioning the parking gear PG on an output shaft close to an inhibitor switch and/or the manual valve of the transmission case.

An exemplary double clutch transmission according to an embodiment of the present invention includes: a main input shaft for receiving an engine torque; a first input shaft rotating coaxially with the main input shaft; a second input shaft rotating coaxially with the main input shaft and along an exterior circumference of the first input shaft; first and second clutches for selectively transmitting a torque of the main input shaft to the first and second input shafts respectively; a drive gear unit including a plurality of drive gears disposed respectively on the first and second input shafts; a first output device including a first output shaft disposed parallel to and apart from the main input shaft by a predetermined distance and having a plurality of driven gears and a first output gear thereon, such that torques of drive gears on the first and second input shafts are selectively changed and output; a second output device including a second output shaft disposed parallel to and apart from the main input shaft by a predetermined distance and having a plurality of driven gears, a second output gear, and a reverse driven gear thereon, such that torques of drive gears on the first and second input shafts are selectively changed and output; a differential gear commonly connected to the first output gear and the second output gear; and a parking gear disposed on one output shaft of the first and second output shafts in a transmission case at an axial position thereof corresponding to one drive gear engaged with one driven gear of another output shaft.

The drive gear unit may include: first and third drive gears formed on one input shaft among the first and second input shafts; and second, fourth, and sixth drive gears formed on another input shaft among the first and second input shafts.

The first output device may include: the first output shaft; first, second, and third driven gears disposed on the first output shaft and respectively engaged with the first, second, and third drive gears; a first synchronizing device for selectively transmitting torques of the first and third driven gears to the first output shaft; a second synchronizing device for selectively transmitting a torque of the second driven gear to the first output shaft; the first output gear disposed on the first output shaft and engaged with the differential gear; and the parking gear disposed on the first output shaft at an axial position thereof corresponding to one drive gear on the second input shaft between the second driven gear and the first output gear, the parking gear being disengaged from the one drive gear, such that torques of the first, second, and third drive gears on the first and second input shafts are selectively changed and output.

The one drive gear on the second input shaft may be the sixth drive gear. The second output device may include: the second output shaft; fourth, fifth, and sixth driven gears disposed on the second output shaft and respectively engaged with the fourth, third, and sixth drive gears; a first mediating gear engaged with the first drive gear; a second mediating gear connected to the first mediating gear by an idle shaft; the reverse driven gear engaged with the second mediating gear and disposed on the second output shaft between the first mediating gear and the fourth driven gear such that at least some gear teeth of the reverse driven gear are close to an exterior circumference of an input shaft between the first and fourth drive gears; a third synchronizing device for selectively transmitting torques of the fifth driven gear and the reverse driven gear to the second output shaft; a fourth synchronizing device for selectively transmitting torques of the fourth driven gear and the sixth driven gear to the second output shaft; and the second output gear disposed on the second output shaft and engaged with the differential gear, such that torques of the first, third, fourth, and sixth drive gears on the first and second input shafts are selectively changed and output.

The first, second, third, fourth, and sixth drive gears may be disposed in a sequence of the third drive gear, the first drive gear, the fourth drive gear, the second drive gear, and the sixth drive gear. The first and third drive gears may be formed on the first input shaft; and the second, fourth, and sixth drive gears may be formed on the second input shaft.

The first output device may include: the first output shaft; first, second, third, and fourth driven gears disposed on the first output shaft and respectively engaged with the first, second, third, and fourth drive gears; a first synchronizing device for selectively transmitting torques of the first and third driven gears to the first output shaft; a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

The second output device may include: the second output shaft; fifth and sixth driven gears disposed on the second output shaft and respectively engaged with the third and sixth drive gears; a first mediating gear engaged with the first drive gear; a second mediating gear connected to the first mediating gear by an idle shaft; the reverse driven gear engaged with the second mediating gear and disposed on the second output shaft between the sixth driven gear and the second output gear such that at least some gear teeth of the reverse driven gear are close to an exterior circumference of the second input shaft between the second and fourth drive gears; a third synchronizing device for selectively transmitting a torque of the fifth driven gear and the sixth driven gear to the second output shaft; a fourth synchronizing device for selectively transmitting torques of the sixth driven gear and the reverse driven gear to the second output shaft; the second output gear disposed on the second output shaft and engaged with the differential gear; and the parking gear disposed on the second output shaft at an axial position thereof corresponding to one drive gear on the second input shaft between the reverse driven gear and the second output gear, the parking gear being disengaged from the one drive gear, such that torques of the first, third, and sixth drive gears on the first and second input shafts are selectively changed and output.

The one drive gear on the second input shaft may be the fourth drive gear. The first, second, third, fourth, and sixth drive gears may be disposed in a sequence of the third drive gear, the first drive gear, the sixth drive gear, the second drive gear, and the fourth drive gear.

Another exemplary double clutch transmission according to the present invention includes: a main input shaft for receiving an engine torque; a first input shaft rotating coaxially with the main input shaft; a second input shaft rotating coaxially with the main input shaft and along an exterior circumference of the first input shaft; first and second clutches for selectively transmitting a torque of the main input shaft to the first and second input shafts respectively; first and third drive gears formed on one input shaft among the first and second input shafts; second, fourth, and sixth drive gears formed on another input shaft among the first and second input shafts; a first output device including a first output shaft disposed parallel to and apart from the main input shaft by a predetermined distance and having a plurality of driven gears and a first output gear thereon, such that torques of the first, second, and third drive gears on the first and second input shafts are selectively changed and output; a second output device including a second output shaft disposed parallel to and apart from the main input shaft by a predetermined distance and having a plurality of driven gears, a second output gear, and a reverse driven gear thereon, such that torques of the first, third, fourth, and sixth drive gears on the first and second input shafts are selectively changed and output; a differential gear commonly connected to the first output gear and the second output gear; and a parking gear disposed on the first output shaft in a transmission case at an axial position thereof corresponding to one drive gear engaged with one driven gear of the second output shaft.

The first output device may include: the first output shaft; first, second, and third driven gears disposed on the first output shaft and respectively engaged with the first, second, and third drive gears; a first synchronizing device for selectively transmitting torques of the first and third driven gears to the first output shaft; a second synchronizing device for selectively transmitting a torque of the second driven gear to the first output shaft; the first output gear disposed on the first output shaft and engaged with the differential gear; and the parking gear disposed on the first output shaft at an axial position thereof corresponding to one drive gear on the second input shaft between the second driven gear and the first output gear, the parking gear being disengaged from the one drive gear, such that torques of the first, second, and third drive gears on the first and second input shafts are selectively changed and output.

The one drive gear on the second input shaft may be the sixth drive gear. The second output device may include: the second output shaft; fourth, fifth, and sixth driven gears disposed on the second output shaft and respectively engaged with the fourth, third, and sixth drive gears; a first mediating gear engaged with the first drive gear; a second mediating gear connected to the first mediating gear by an idle shaft; the reverse driven gear engaged with the second mediating gear and disposed on the second output shaft between the first mediating gear and fourth driven gear such that at least some gear teeth of the reverse driven gear are close to an exterior circumference of the second input shaft between the first and fourth drive gears; a third synchronizing device for selectively transmitting torques of the fifth driven gear and the reverse driven gear to the second output shaft; a fourth synchronizing device for selectively transmitting torques of the fourth driven gear and the sixth driven gear to the second output shaft; and the second output gear disposed on the second output shaft and engaged with the differential gear, such that torques of the first, third, fourth, and sixth drive gears on the first and second input shafts are selectively changed and output.

The first, second, third, fourth, and sixth drive gears may be disposed in a sequence of the third drive gear, the first drive gear, the fourth drive gear, the second drive gear, and the sixth drive gear.

Another exemplary double clutch transmission according to the present invention includes: a main input shaft for receiving an engine torque; a first input shaft rotating coaxially with the main input shaft; a second input shaft rotating coaxially with the main input shaft and along an exterior circumference of the first input shaft; first and second clutches for selectively transmitting a torque of the main input shaft to the first and second input shafts respectively; first and third drive gears formed on one input shaft among the first and second input shafts; second, fourth, and sixth drive gears formed on another input shaft among the first and second input shafts; a first output device including a first output shaft disposed parallel to and apart from the main input shaft by a predetermined distance and having a plurality of driven gears and a first output gear thereon, such that torques of the first, second, third, and fourth drive gears on the first and second input shafts are selectively changed and output; a second output device including a second output shaft disposed parallel to and apart from the main input shaft by a predetermined distance and having a plurality of driven gears, a second output gear, and a reverse driven gear thereon, such that torques of the first, third, and sixth drive gears on the first and second input shafts are selectively changed and output; a differential gear commonly connected to the first output gear and the second output gear; and a parking gear disposed on the second output shaft in a transmission case at an axial position thereof corresponding to one drive gear engaged with one driven gear of the first output shaft.

The first output device may include: the first output shaft; first, second, third, and fourth driven gears disposed on the first output shaft and respectively engaged with the first, second, third, and fourth drive gears; a first synchronizing device for selectively transmitting torques of the first and third driven gears to the first output shaft; a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

The second output device may include: the second output shaft; fifth and sixth driven gears disposed on the second output shaft and respectively engaged with the third and sixth drive gears; a first mediating gear engaged with the first drive gear; a second mediating gear connected to the first mediating gear by an idle shaft; the reverse driven gear engaged with the second mediating gear and disposed on the second output shaft between the sixth driven gear and the second output gear such that at least some gear teeth of the reverse driven gear are close to an exterior circumference of the second input shaft between the second and fourth drive gears; a third synchronizing device for selectively transmitting a torque of the fifth driven gear and the sixth driven gear to the second output shaft; a fourth synchronizing device for selectively transmitting torques of the sixth driven gear and the reverse driven gear to the second output shaft; the second output gear disposed on the second output shaft and engaged with the differential gear; and the parking gear disposed on the second output shaft at an axial position thereof corresponding to one drive gear on the second input shaft between the reverse driven gear and the second output gear, the parking gear being disengaged from the one drive gear, such that torques of the first, third, and sixth drive gears on the first and second input shafts are selectively changed and output.

The one drive gear on the second input shaft may be the fourth drive gear. The first, second, third, fourth, and sixth drive gears may be disposed in a sequence of the third drive gear, the first drive gear, the sixth drive gear, the second drive gear, and the fourth drive gear.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 5:
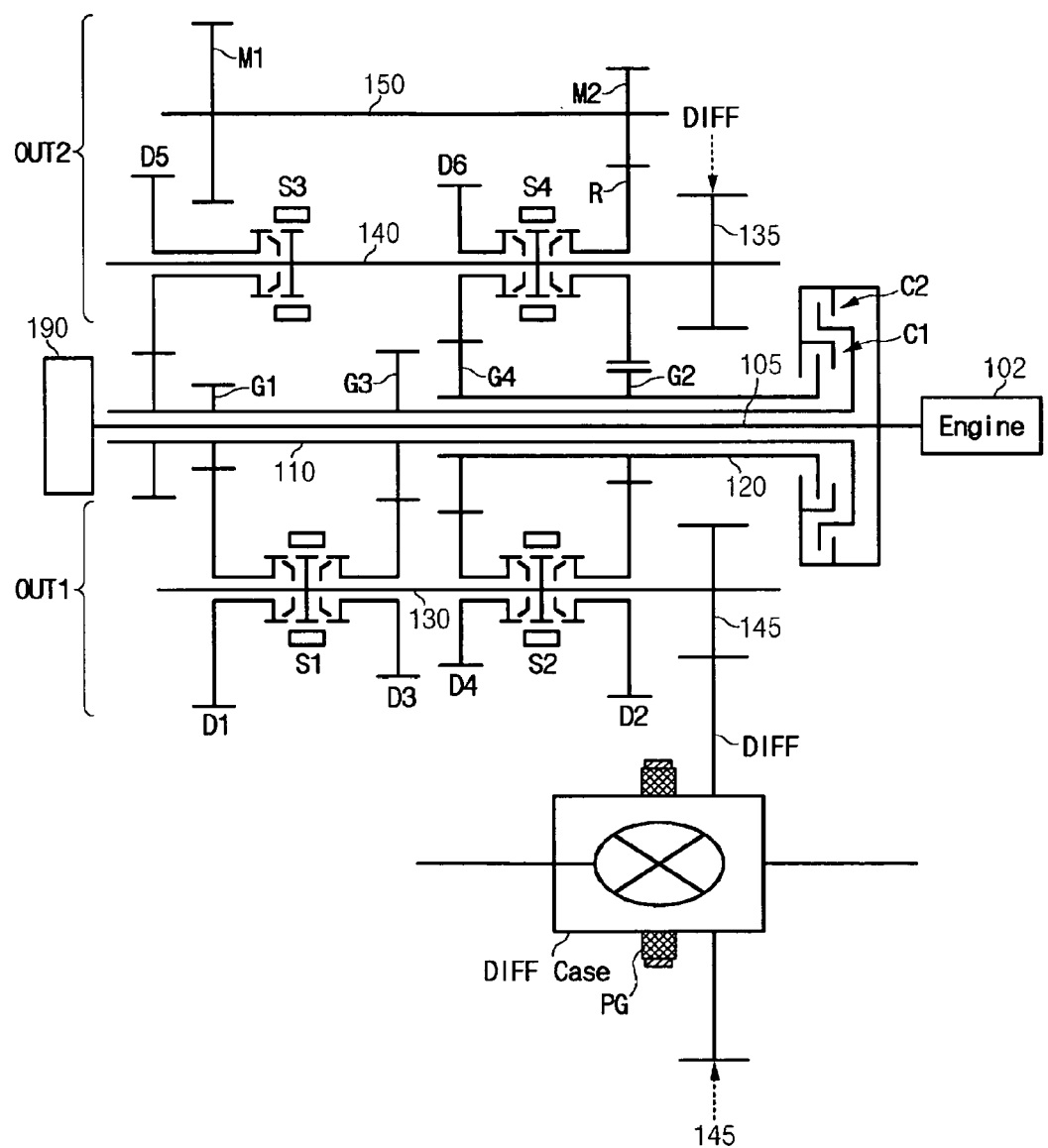
FIG. 5 is a schematic diagram of a double clutch transmission.
Figure 6:
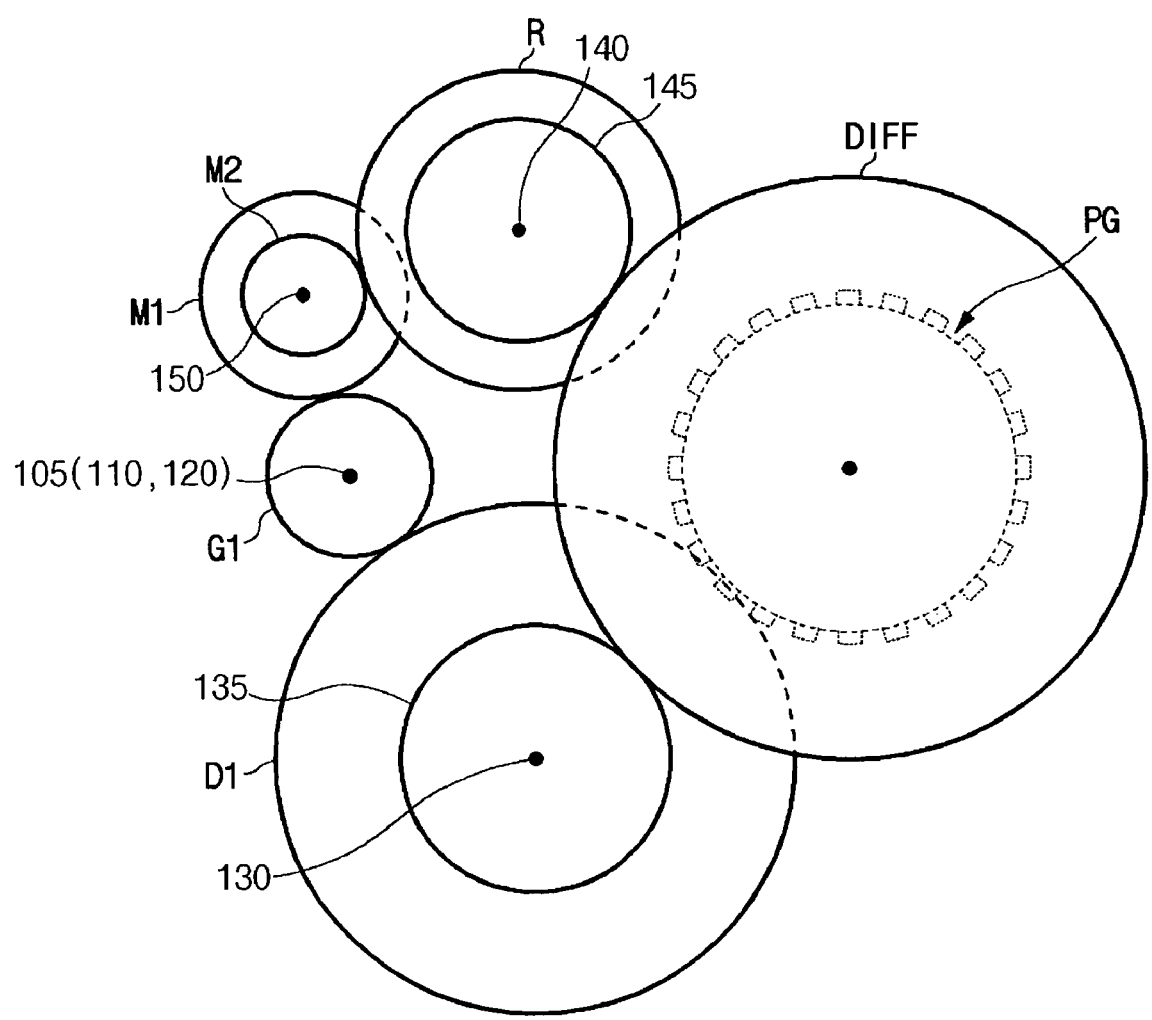
FIG. 6 is a drawing for illustrating a spatial relationship of an idle shaft for a reverse speed, a differential gear, a parking gear, first and second input shafts, and first and second output shafts of a double clutch transmission shown in FIG. 5.

In order to address such drawbacks, a double clutch transmission as shown in FIGS. 5 and 6 has recently been developed. According to such a double clutch transmission, two input shafts 110 and 120 have a plurality of drive gears G1, G2, G3, G4, and G5 disposed thereon. The drive gears rotate coaxially with and are connected to a main input shaft 105 via two clutches C1 and C2. A plurality of driven gears D1, D2, D3, D4, D5, and D6 and a reverse driven gear R engaged with the drive gears are dividedly disposed on two output shafts 130 and 140 disposed parallel to the input shafts 110 and 120. Two output devices OUT1 and OUT2 selectively change torques of the drive gears and output the changed torques through a differential gear DIFF.

However, the space in a transmission case of a double clutch transmission having two output shafts 130 and 140 is insufficient for accommodating a parking gear of a parking apparatus in addition to the drive gears G1, G2, G3, G4, and G5. So, usually, a parking gear PG is integrally formed with a differential case.

When the parking gear PG is integrally formed with the differential case, torque acting on the parking gear PG due to a weight of a vehicle e.g., on a slope may easily become excessive since torque acts on the differential case at 3 to 4 times that which acts on the output shafts 130 and 140. Therefore, a parking apparatus requires a high torque capacity.

In addition, the parking gear PG is positioned on the transmission case far from an inhibitor switch and/or the manual valve. Therefore, a linkage structure for transferring a movement of a shift lever (frequently called a transmission gear shift lever, and abbreviated as T.G.S lever) to the manual valve of a valve body becomes complex.

FIG. 6 does not illustrate a connection between the first mediating gear M1 and the first drive gear G1, or a connection between the second output shaft 140 and the differential gear DIFF. This is because the first and second input shafts 110 and 120, the first and second output shafts 130 and 140, the idle shaft 150, and the differential gear DIFF are planarly drawn for illustrational convenience, although they are spatially disposed. Such a spatial disposition of the first and second input shafts 110 and 120, the first and second output shafts 130 and 140, the idle shaft 150, and the differential gear DIFF appears in FIG. 6.

FIG. 6 is a view of FIG. 5 seen from the right thereof, and some gears shown in FIG. 5 are intentionally not shown in FIG. 6 for better understanding of the spatial relationship among rotation axes of rotating element.

Figure 1:
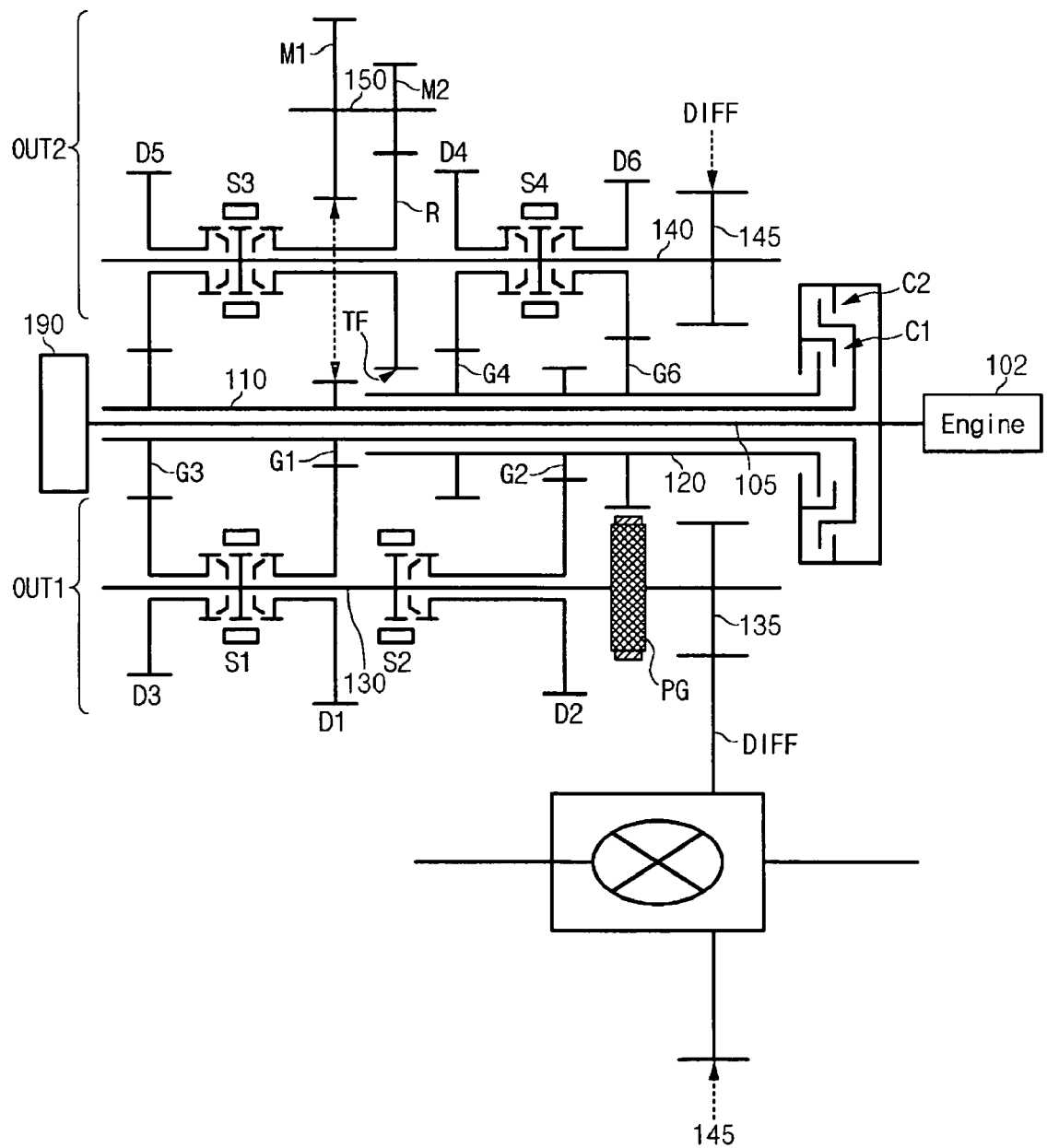
FIG. 1 is a schematic diagram of a double clutch transmission according to a first embodiment of the present invention.

An embodiment of the present invention will hereinafter be described in detail with reference to the accompanying drawings. FIG. 1 is a schematic diagram of a double clutch transmission according to a first embodiment of the present invention. As shown in FIG. 1, a double clutch transmission according to a first embodiment of the present invention includes a main input shaft 105; first and second input shafts 110 and 120; first and second clutches C1 and C2; first, second, third, fourth, and sixth drive gears G1, G2, G3, G4, and G6; first and second output devices OUT1 and OUT2; and a differential gear DIFF. The main input shaft 105 receives a torque of an engine 102. The first input shaft 110 rotates coaxially with the main input shaft 105.

FIG. 1 illustrates that the main input shaft 105 penetrates through the first input shaft 110 to be connected to an oil pump 190, and this is only to exemplarily show that a double clutch transmission of the present invention may be realized as a wet-type. Therefore, it should not be understood that the scope of the present invention is limited to as shown in FIG. 1. For example, for a dry-type double clutch transmission, the first input shaft 110 may be formed as a rod having no interior space.

The second input shaft 120 rotates coaxially with the main input shaft 105 and along an exterior circumference of the first input shaft 110. The first and second clutches C1 and C2 selectively transmit a torque of the main input shaft 105 to the first and second input shafts 110 and 120. Therefore, the torque of the main input shaft 105 is transmitted to the first input shaft 110 under an operation of the first clutch C1, and to the second input shaft 120 under an operation of the second clutch C2.

The first and third drive gears G1 and G3 are formed on the first input shaft 110, and the second, fourth, and sixth drive gears G2, G4, and G6 are formed on the second input shaft 120. In further detail, the first and third drive gears G1 and G3 are disposed on the first input shaft 110 such that an end of the second input shaft 120 is closer to the first drive gear G1 than to the third drive gear G3. In addition, the second, fourth, and sixth drive gears G2, G4, and G6 are disposed on the second input shaft 120 such that the engine 102 is closest to the sixth drive gear G6, further from the second drive gear G2, and farthest from the fourth drive gear G4. In other words, regarding disposition of such drive gears, referring to FIG. 1 related to a first embodiment of the present invention, the first, second, third, fourth, and sixth drive gears G1, G2, G3, G4, and G6 are disposed in a sequence of the third drive gear G3, the first drive gear G1, the fourth drive gear G4, the second drive gear G2, and the sixth drive gear G6.

As shown in FIG. 1, a double clutch transmission according to an embodiment of the present invention further includes a first output device OUT1 and a second output device OUT2. The first output device OUT1 selectively changes torques of the first, second, and third drive gears G1, G2, and G3, and outputs the changed torques. The second output device OUT2 selectively changes torques of the first, third, fourth, and sixth drive gears G1, G3, G4, and G6, and outputs the changed torques.

As shown in FIG. 1, the first output device OUT1 includes a first output shaft 130, first, second, and third driven gears D1, D2, and D3, first and second synchronizing devices S1 and S2, and a first output gear 135. The first output shaft 130 is disposed parallel to and apart from the main input shaft 105 by a predetermined distance. The first, second, and third driven gears D1, D2, and D3 are disposed on the first output shaft 130, and they are respectively engaged with the first, second, and third drive gears G1, G2, and G3.

The first synchronizing device S1 selectively transmits torques of the first and third driven gears D1 and D3 to the first output shaft 130. The second synchronizing device S2 selectively transmits a torque of the second driven gear D2 to the first output shaft 130.

In addition, the first output gear 135 is disposed on the first output shaft 130 and is engaged with the differential gear DIFF such that selectively changed torques of the first, second, and third drive gears G1, G2, and G3 may be output therethrough to the differential gear DIFF.

As shown in FIG. 1, the second output device OUT2 includes a second output shaft 140; fourth, fifth, and sixth driven gears D4, D5, and D6; first and second mediating gears M1 and M2; a reverse driven gear R; third and fourth synchronizing devices S3 and S4; and a second output gear 145. The second output shaft 140 is disposed parallel to and apart from the main input shaft 105 by a predetermined distance. The fourth, fifth, and sixth driven gears D4, D5, and D6 are disposed on the second output shaft 140, and are respectively engaged with the fourth, third, and sixth drive gears G4, G3, and G6.

The first mediating gear M1 is engaged with the first drive gear G1, and the second mediating gear M2 is connected to the first mediating gear M1 by an idle shaft 150. The reverse driven gear R is engaged with the second mediating gear M2 and is disposed on the second output shaft 140 between the first mediating gear M1 and the fourth driven gear D4. Gear teeth (more specifically, the outer surface of some gear teeth) TF of the reverse driven gear R lie close to an exterior circumference of the first input shaft between the first and fourth drive gear G1 and G4.

The third synchronizing device S3 selectively transmits torques of the fifth driven gear D5 and the reverse driven gear R to the second output shaft 140. The fourth synchronizing device S4 selectively transmits torques of the fourth driven gear D4 and the sixth driven gear D6 to the second output shaft 140.

In addition, the second output gear 145 is disposed on the second output shaft 140 and engaged with the differential gear DIFF such that selectively changed torques of the first, third, and sixth drive gears G1, G3, and G6 may be output therethrough to the differential gear DIFF.

In addition, the parking gear PG is disposed on the first output shaft 130 of the first output device OUT1 between the second driven gear D2 and the first output gear 135. In this case the parking gear PG is disposed at an axial position corresponding to the sixth drive gear G6 of the second input shaft. Therefore, limited space in a transmission case may be efficiently utilized.

In addition, when the parking gear PG is disposed on the first output shaft 130, torque acting on the parking gear PG due to a weight of a vehicle e.g., on a slope, is reduced by a reduction ratio between the differential gear DIFF and the first output gear 135. This implies that a torque capacity of a parking apparatus may be minimally designed.

In addition, the parking gear PG may be positioned on the first output shaft 130 close to an inhibitor switch and/or the manual valve of the transmission case. Therefore, a linkage structure for transferring a movement of a shift lever (frequently called a transmission gear shift lever, and abbreviated as T.G.S lever) to the manual valve of a valve body may be simplified. Details of the first, second, third, and fourth synchronizing devices S1, S2, S3, and S4 may be obviously realized by a person of ordinary skill in the art referring to synchronizing devices of a conventional manual transmission.

An embodiment of the present invention may further include first, second, third, and fourth actuators (not shown) respectively for actuating the first, second, third, and fourth synchronizing devices S1, S2, S3, and S4 to left and right in FIG. 1. In this case, the first, second, third, and fourth actuators (not shown) may be driven by a controller (not shown).

FIG. 1 does not illustrate a connection between the first mediating gear M1 and the first drive gear G1, or a connection between the second output shaft 140 and the differential gear DIFF. This is because the first and second input shafts 110 and 120, the first and second output shafts 130 and 140, the idle shaft 150, and the differential gear DIFF are planarly drawn for illustrational convenience, although they are spatially disposed. Such a spatial disposition of the first and second input shafts 110 and 120, the first and second output shafts 130 and 140, the idle shaft 150, the differential gear DIFF, and the parking gear PG appears in FIG. 2.

Figure 2:
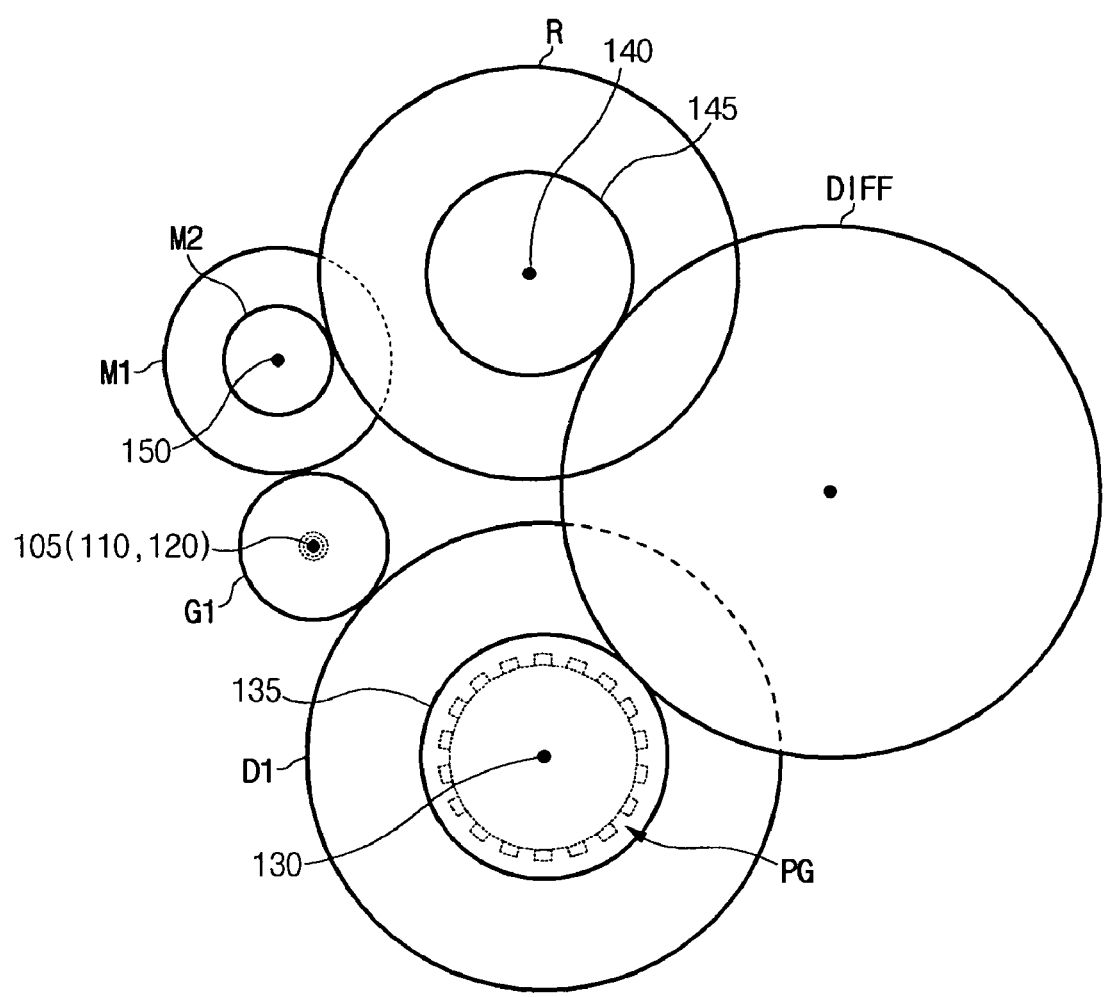
FIG. 2 is a drawing for illustrating a spatial relationship of an idle shaft for a reverse speed, a differential gear, a parking gear, first and second input shafts, and first and second output shafts of a double clutch transmission according to a first embodiment of the present invention.

FIG. 2 is a drawing for illustrating a spatial relationship of an idle shaft 150 for a reverse speed, a differential gear DIFF, a parking gear PG, first and second input shafts 110 and 120, and first and second output shafts 130 and 140 of a double clutch transmission according to a first embodiment of the present invention. FIG. 2 is a view of FIG. 1 seen from the right thereof, and some gears shown in FIG. 1 are intentionally not shown in FIG. 2 for better understanding of the spatial relationship among rotation axes of rotating elements.

As shown in FIG. 2, the first and second output shafts 130 and 140 are disposed apart from the second input shaft 120. The idle shaft 150 for a reverse speed is disposed at a position at which it may form a triangle together with the first input shaft 110 and the second output shaft 140. The first mediating gear M1 on the idle shaft 150 is engaged with the first drive gear G1 of the first input shaft 110, and the second mediating gear M2 on the idle shaft 150 is engaged with the reverse driven gear R of the second output shaft 140.

The differential gear DIFF is disposed at a position that it may form a triangle together with the first and second output shafts 130 and 140, so that the differential gear DIFF is commonly engaged with the first and second output gears 135 and 145 of the first and second output shafts 130 and 140. The parking gear PG on the first output shaft is not engaged with any gear.

According to such structural features of a double clutch transmission, disposition of only five drive gears on input shafts may enable a total of seven speeds, i.e., six forward speeds and one reverse speed. Therefore, a length of a forward six-speed double clutch transmission may be greatly shortened.

In addition, shortened length of the idle shaft 150 for a reverse speed contributes to a reduction of rotational inertia of the transmission in forward speeds, an enhancement of torque transmission efficiency in the reverse speed, and an increase in durability of the idle shaft 150 for a reverse speed. In addition, the parking gear PG is disposed on the first output shaft 130, at an axial position corresponding to the sixth drive gear G6 of the second input shaft 120 engaged with the sixth driven gear D6 of the second output shaft 140.

Therefore, torque acting on the parking gear PG due to a weight of a vehicle is reduced by a reduction ratio between the differential gear DIFF and the first output gear 135.

In addition, the parking gear PG may be positioned on the first output shaft 130 closest to an inhibitor switch and/or the manual valve of the transmission case. Therefore, the linkage structure for transferring a movement of a shift lever (frequently called a transmission gear shift lever, and abbreviated as T.G.S lever) to the manual valve of a valve body may be simplified.

Referring back to FIG. 1, shifting operations of such a double clutch transmission according to a first embodiment of the present invention are hereinafter described in detail. For shifting to the first speed, the first driven gear D1 and the first output shaft 130 are synchronously engaged by operating the first synchronizing device S1 to the right in FIG. 1. Then, the shifting to the first speed may be terminated by operating the first clutch C1.

For shifting to the second speed, firstly, the second driven gear D2 and the first output shaft 130 are synchronously engaged by operating the second synchronizing device S2 to the right in FIG. 1 while the first clutch C1 operates and the second clutch C2 is released. Then, the shifting to the second speed may be terminated by releasing the first clutch C1 and operating the second clutch C2.

For shifting to the third speed, firstly, the third driven gear D3 and the first output shaft 130 are synchronously engaged by operating the first synchronizing device S1 to the left in FIG. 1 while the first clutch C1 is released and the second clutch C2 operates. Then, the shifting to the third speed may be terminated by releasing the second clutch C2 and operating the first clutch C1.

For shifting to the fourth speed, firstly, the fourth driven gear D4 and the second output shaft 140 are synchronously engaged by operating the fourth synchronizing device S4 to the left in FIG. 1 while the first clutch C1 operates and the second clutch C2 is released. Then, the shifting to the fourth speed may be terminated by releasing the first clutch C1 and operating the second clutch C2.

For shifting to the fifth speed, firstly, the fifth driven gear D5 and the second output shaft 140 are synchronously engaged by operating the third synchronizing device S3 to the left in FIG. 1 while the first clutch C1 is released and the second clutch C2 operates. Then, the shifting to the fifth speed may be terminated by releasing the second clutch C2 and operating the first clutch C1.

For shifting to the sixth speed, firstly, the sixth driven gear D6 and the second output shaft 140 are synchronously engaged by operating the fourth synchronizing device S4 to the right in FIG. 1 while the first clutch C1 operates and the second clutch C2 is released. Then, the shifting to the sixth speed may be terminated by releasing the first clutch C1 and operating the second clutch C2.

For shifting to the reverse speed, firstly, the reverse driven gear R and the second output shaft 140 are synchronously engaged by operating the third synchronizing device S3 to the right in FIG. 1 while the first clutch C1 is released and the second clutch C2 operates. Then, the shifting to the reverse speed may be terminated by releasing the second clutch C2 and operating the first clutch C1, the reverse speed having a large reduction ratio of as much as that of the first speed.

Figure 3:
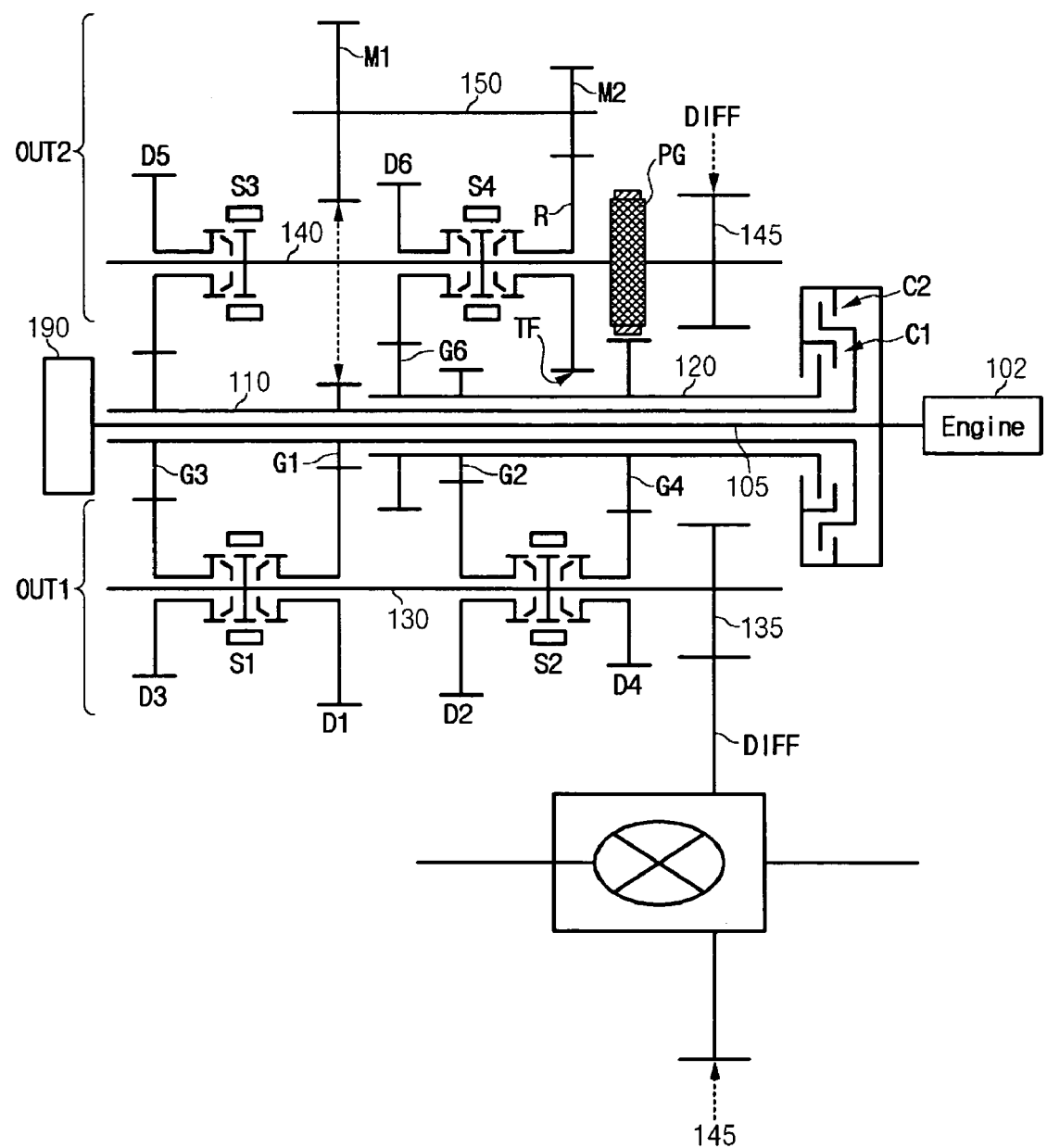
FIG. 3 is a schematic diagram of a double clutch transmission according to a second embodiment of the present invention.

FIG. 3 is a schematic diagram of a double clutch transmission according to a second embodiment of the present invention. As shown in FIG. 3, a double clutch transmission according to a first embodiment of the present invention includes a main input shaft 105; first and second input shafts 110 and 120; first and second clutches C1 and C2; first, second, third, fourth, and sixth drive gears G1, G2, G3, G4, and G6; first and second output devices OUT1 and OUT2; and a differential gear DIFF.

Details of the main input shaft 105, first and second input shafts 110 and 120, first and second clutches C1 and C2, and a cooperative relationship thereamong of a double clutch transmission according to a second embodiment are the same as has been described in connection with the first embodiment.

The first and third drive gears G1 and G3 according to the second embodiment are formed on the first input shaft 110, and the second, fourth, and sixth drive gears G2, G4, and G6 are formed on the second input shaft 120.

In further detail, the first and third drive gears G1 and G3 are disposed on the first input shaft 110 such that an end of the second input shaft 120 is closer to first drive gear G1 than to the third drive gear G3. In addition, the second, fourth, and sixth drive gears G2, G4, and G6 are disposed on the second input shaft 120 such that the engine 102 is closest to the fourth drive gear G4, further from the second drive gear G2, and farthest from the sixth drive gear G6. In other words, regarding disposition of such drive gears, referring to FIG. 3 related to a second embodiment of the present invention, the first, second, third, fourth, and sixth drive gears G1, G2, G3, G4, and G6 are disposed in a sequence of the third drive gear G3, the first drive gear G1, the sixth drive gear G6, the second drive gear G2, and the fourth drive gear G4.

As shown in FIG. 3, a double clutch transmission according to a second embodiment of the present invention further includes a first output device OUT1 and a second output device OUT2. The first output device OUT1 selectively changes torques of the first, second, third, and fourth drive gears G1, G2, G3, and G4, and outputs the changed torques. The second output device OUT2 selectively changes torques of the first, third, and sixth drive gears G1, G3, and G6, and outputs the changed torques.

As shown in FIG. 3, the first output device OUT1 includes a first output shaft 130; first, second, third, and fourth driven gears D1, D2, D3, and D4; first and second synchronizing devices S1 and S2; and a first output gear 135.

The first output shaft 130 is disposed parallel to and apart from the main input shaft 105 by a predetermined distance. The first, second, third, and fourth driven gears D1, D2, D3, and D4 are disposed on the first output shaft 130, and they are respectively engaged with the first, second, third, and fourth drive gears G1, G2, G3, and G4. The first synchronizing device S1 selectively transmits torques of the first and third driven gears D1 and D3 to the first output shaft 130. The second synchronizing device S2 selectively transmits torques of the second and fourth driven gears D2 and D4 to the first output shaft 130.

In addition, the first output gear 135 is disposed on the first output shaft 130 and engaged with the differential gear DIFF such that selectively changed torques of the first, second, third, and fourth drive gears G1, G2, G3, and G4 may be output therethrough to the differential gear DIFF. As shown in FIG. 3, the second output device OUT2 includes a second output shaft 140, fifth and sixth driven gears D5 and D6, first and second mediating gears M1 and M2, a reverse driven gear R, third and fourth synchronizing devices S3 and S4, and a second output gear 145.

The second output shaft 140 is disposed parallel to and apart from the main input shaft 105 by a predetermined distance. The fifth and sixth driven gears D5 and D6 are disposed on the second output shaft 140, and are respectively engaged with the third and sixth drive gears G3 and G6. The first mediating gear M1 is engaged with the first drive gear G1, and the second mediating gear M2 is connected to the first mediating gear M1 by an idle shaft 150.

The reverse driven gear R is engaged with the second mediating gear M2 and is disposed on the second output shaft 140 between the sixth driven gear D6 and the second output gear 145. Gear teeth (more specifically, the outer surface of some gear teeth) TF of the reverse driven gear R lie close to an exterior circumference of the second input shaft 120 between the second and fourth drive gears G2 and G4.

The third synchronizing device S3 selectively transmits a torque of the fifth driven gear D5 to the second output shaft 140. The fourth synchronizing device S4 selectively transmits torques of the sixth driven gear D6 and the reverse driven gear R to the second output shaft 140. In addition, the second output gear 145 is disposed on the second output shaft 140 and is engaged with the differential gear DIFF such that selectively changed torques of the first, third, and sixth drive gears G1, G3, and G6 may be output therethrough to the differential gear DIFF.

In addition, the parking gear PG is disposed on the second output shaft 140 of the first output device OUT1 between the reverse driven gear R and the second output gear 145. In this case the parking gear PG is disposed at an axial position corresponding to the fourth drive gear G4 of the second input shaft. Therefore, limited space in a transmission case may be efficiently utilized.

In addition, when the parking gear PG is disposed on the first output shaft 140, torque acting on the parking gear PG due to a weight of a vehicle e.g., on a slope is reduced by a reduction ratio between the differential gear DIFF and the second output gear 145. This implies that a torque capacity of a parking apparatus may be minimally designed.

In addition, the parking gear PG may be positioned on the second output shaft 140 close to an inhibitor switch and/or the manual valve of the transmission case. Therefore, the linkage structure for transferring a movement of a shift lever (frequently called a transmission gear shift lever, and abbreviated as T.G.S lever) to the manual valve of a valve body may be simplified.

Details of the first, second, third, and fourth synchronizing devices S1, S2, S3, and S4 are the same as has been described in connection with the first embodiment. Although minor differences lie in connections of the synchronizing devices to driven gears, they are obvious changes according to different dispositions of driven gears, and need not be described in further detail.

FIG. 3 does not illustrate a connection between the first mediating gear M1 and the first drive gear G1, or a connection between the second output shaft 140 and the differential gear DIFF. This is because the first and second input shafts 110 and 120, the first and second output shafts 130 and 140, the idle shaft 150, and the differential gear DIFF are planarly drawn for illustrational convenience, although they are spatially disposed.

Figure 4:
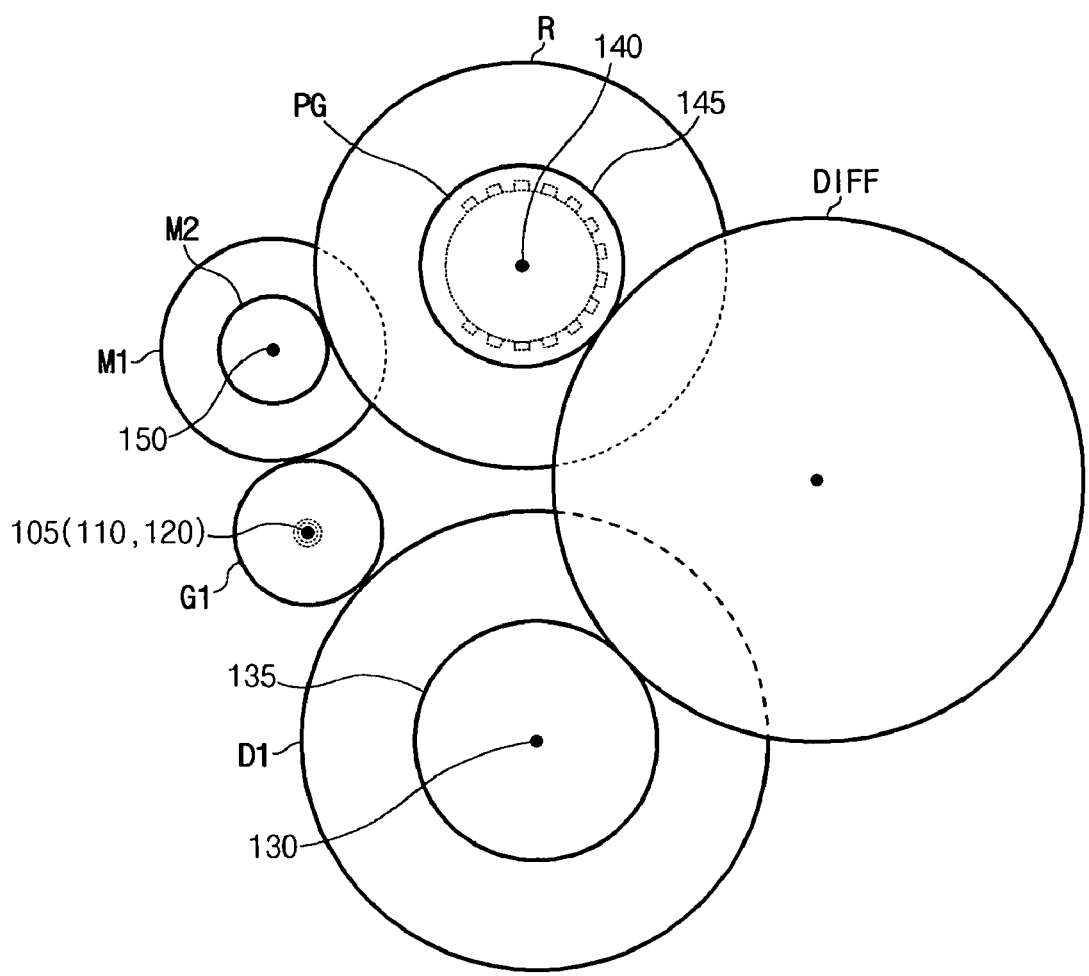
FIG. 4 is a drawing for illustrating a spatial relationship of an idle shaft for a reverse speed, a differential gear, a parking gear, first and second input shafts, and first and second output shafts of a double clutch transmission according to a second embodiment of the present invention.

Such a spatial disposition of the first and second input shafts 110 and 120, the first and second output shafts 130 and 140, the idle shaft 150, the differential gear DIFF, and the parking gear PG appears in FIG. 4.

FIG. 4 is a drawing for illustrating a spatial relationship of an idle shaft 150 for a reverse speed, a differential gear DIFF, a parking gear PG, first and second input shafts 110 and 120, and first and second output shafts 130 and 140 of a double clutch transmission according to a second embodiment of the present invention. FIG. 4 is a view of FIG. 3 seen from the right thereof, and some gears shown in FIG. 1 are intentionally not shown in FIG. 4 for better understanding of the spatial relationship among rotation axes of rotating elements.

As shown in FIG. 4, the first and second output shafts 130 and 140 are disposed apart from the second input shaft 120. The idle shaft 150 for a reverse speed is disposed at a position in which it may form a triangle together with the first input shaft 110 and the second output shaft 140. The first mediating gear M1 on the idle shaft 150 is engaged with the first drive gear G1 of the first input shaft 110, and the second mediating gear M2 on the idle shaft 150 is engaged with the reverse driven gear R of the second output shaft 140.

The differential gear DIFF is disposed at a position in which it may form a triangle together with the first and second output shafts 130 and 140, so that the differential gear DIFF is commonly engaged with the first and second output gears 135 and 145 of the first and second output shafts 130 and 140. The parking gear PG on the first output shaft is not engaged with any gear.

According to such structural features of a double clutch transmission, disposition of only five drive gears on input shafts may enable a total of seven speeds, i.e., six forward speeds and one reverse speed. Therefore, a length of a forward six-speed double clutch transmission may be greatly shortened.

In addition, the shortened length of the idle shaft 150 for a reverse speed contributes to a reduction of rotational inertia of the transmission in forward speeds, an enhancement of torque transmission efficiency in the reverse speed, and an increase in durability of the idle shaft 150 for a reverse speed.

In addition, the parking gear PG is disposed on the second output shaft 140, at an axial position corresponding to the fourth drive gear G4 of the second input shaft 120 engaged with the fourth driven gear D4 of the first output shaft 140. Therefore, torque acting on the parking gear PG due to a weight of a vehicle is reduced by a reduction ratio between the differential gear DIFF and the second output gear 145.

In addition, the parking gear PG may be positioned on the second output shaft 140 closest to an inhibitor switch and/or the manual valve of the transmission case. Therefore, a linkage structure for transferring a movement of a shift lever (frequently called a transmission gear shift lever, and abbreviated as T.G.S lever) to the manual valve of a valve body may be simplified.

Referring back to FIG. 3, shifting operations of such a double clutch transmission according to a second embodiment of the present invention are hereinafter described in detail. For shifting to the first speed, the first driven gear D1 and the first output shaft 130 are synchronously engaged by operating the first synchronizing device S1 to the right in FIG. 3. Then, the shifting to the first speed may be terminated by operating the first clutch C1.

For shifting to the second speed, firstly, the second driven gear D2 and the first output shaft 130 are synchronously engaged by operating the second synchronizing device S2 to the left in FIG. 3 while the first clutch C1 operates and the second clutch C2 is released. Then, the shifting to the second speed may be terminated by releasing the first clutch C1 and operating the second clutch C2.

For shifting to the third speed, firstly, the third driven gear D3 and the first output shaft 130 are synchronously engaged by operating the first synchronizing device S1 to the left in FIG. 3 while the first clutch C1 is released and the second clutch C2 operates. Then, the shifting to the third speed may be terminated by releasing the second clutch C2 and operating the first clutch C1.

For shifting to the fourth speed, firstly, the fourth driven gear D4 and the second output shaft 140 are synchronously engaged by operating the second synchronizing device S4 to the right in FIG. 3 while the first clutch C1 operates and the second clutch C2 is released. Then, the shifting to the fourth speed may be terminated by releasing the first clutch C1 and operating the second clutch C2.

For shifting to the fifth speed, firstly, the fifth driven gear D5 and the second output shaft 140 are synchronously engaged by operating the third synchronizing device S3 to the left in FIG. 3 while the first clutch C1 is released and the second clutch C2 operates. Then, the shifting to the fifth speed may be terminated by releasing the second clutch C2 and operating the first clutch C1.

For shifting to the sixth speed, firstly, the sixth driven gear D6 and the second output shaft 140 are synchronously engaged by operating the fourth synchronizing device S4 to the left in FIG. 3 while the first clutch C1 operates and the second clutch C2 is released. Then, the shifting to the sixth speed may be terminated by releasing the first clutch C1 and operating the second clutch C2.

For shifting to the reverse speed, firstly, the reverse driven gear R and the second output shaft 140 are synchronously engaged by operating the fourth synchronizing device S4 to the right in FIG. 3 while the first clutch C1 is released and the second clutch C2 operates. Then, the shifting to the reverse speed may be terminated by releasing the second clutch C2 and operating the first clutch C. The reverse speed having a large reduction ratio of as much as that of the first speed.

As can be seen from the above shifting process, a clutch required to be operated for realization of adjacent speeds alternately changes. In addition, adjacent speeds require different synchronizing devices to be operated. Therefore, a release of a current speed and a realization of a target speed may be independently controlled during shifting from and to adjacent speeds. In addition, during shifting to an adjacent speed, various manipulation techniques that a driver may perform on a manual transmission, e.g., a half-clutch operation, may be realized by controlling engagement timing of an on-coming clutch and release timing of an off-going clutch.

According to an embodiment of the present invention, disposition of only four or five drive gears on input shafts may enable a total of seven speeds, i.e., six forward speeds and one reverse speed. Therefore, a length of a forward six-speed double clutch transmission may be greatly shortened.

In addition, a length of the idle shaft 150 for a reverse speed may be greatly shortened. Accordingly, a transmission may have a light weight. It also contributes to a reduction of rotational inertia of the idle shaft 150, and an enhancement of torque transmission efficiency.

In addition, the parking gear PG is disposed on one output shaft of the two output shafts, at an axial position corresponding to one drive gear of the one input shaft engaged with one driven gear of the other output shaft. Therefore, the limited space in a transmission case may be efficiently utilized.

In addition, when the parking gear PG is disposed on, e.g., the first output shaft 130, torque acting on the parking gear PG due to a weight of a vehicle e.g., on a slope, is reduced by a reduction ratio between the differential gear DIFF and the first output gear 135. This implies that a torque capacity of a parking apparatus may be minimally designed.

In addition, the parking gear PG may be positioned on the first output shaft 130 close to an inhibitor switch and/or the manual valve of the transmission case. Therefore, a linkage structure for transferring a movement of a shift lever (frequently called a transmission gear shift lever, and abbreviated as T.G.S lever) to the manual valve of a valve body may be simplified.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A double clutch transmission comprising:
a main input shaft for receiving an engine torque;
a first input shaft rotating coaxially with the main input shaft;
a second input shaft rotating coaxially with the main input shaft and about an exterior circumference of the first input shaft;
first and second clutches for selectively transmitting a torque of the main input shaft to the first and second input shaft respectively;
a drive gear unit including a plurality of drive gears disposed respectively on the first and second input shafts;
a first output device including a first output shaft disposed parallel to and apart from the main input shaft by a predetermined distance and having a plurality of driven gears and a first output gear thereon, such that torques of drive gears on the first and second input shafts are selectively changed and output;
a second output device including a second output shaft disposed parallel to and apart from the main input shaft by a predetermined distance and having a plurality of driven gears, a second output gear, and a reverse driven gear thereon, such that torques of drive gears on the first and second input shafts are selectively changed and output;
a differential gear commonly connected to the first output gear and the second output gear; and
a parking gear disposed on one output shaft of the first and second output shafts in a transmission case at an axial position thereof corresponding to one drive gear engaged with one driven gear of another output shaft.

2. The double clutch transmission of claim 1, wherein the drive gear unit comprises:
first and third drive gears formed on one input shaft among the first and second input shafts; and
second, fourth, and sixth drive gears formed on another input shaft among the first and second input shafts.

3. The double clutch transmission of claim 2, wherein the first output device comprises:
the first output shaft;
first, second, and third driven gears disposed on the first output shaft and respectively engaged with the first, second, and third drive gears;
a first synchronizing device for selectively transmitting torques of the first and third driven gears to the first output shaft;
a second synchronizing device for selectively transmitting a torque of the second driven gear to the first output shaft;
the first output gear disposed on the first output shaft and engaged with the differential gear; and
the parking gear disposed on the first output shaft at an axial position thereof corresponding to one drive gear on the second input shaft between the second driven gear and the first output gear, the parking gear being disengaged from the one drive gear,
such that torques of the first, second, and third drive gears on the first and second input shafts are selectively changed and output.

4. The double clutch transmission of claim 3, wherein the one drive gear on the second input shaft is the sixth drive gear.

5. The double clutch transmission of claim 3, wherein the second output device comprises:
the second output shaft;
fourth, fifth, and sixth driven gears disposed on the second output shaft and respectively engaged with the fourth, third, and sixth drive gears;
a first mediating gear engaged with the first drive gear;
a second mediating gear connected to the first mediating gear by an idle shaft;
the reverse driven gear engaged with the second mediating gear and disposed on the second output shaft between the first mediating gear and the fourth driven gear such that at least some gear teeth of the reverse driven gear are close to an exterior circumference of an input shaft between the first and fourth drive gears;
a third synchronizing device for selectively transmitting torques of the fifth driven gear and the reverse driven gear to the second output shaft;
a fourth synchronizing device for selectively transmitting torques of the fourth driven gear and the sixth driven gear to the second output shaft; and
the second output gear disposed on the second output shaft and engaged with the differential gear,
such that torques of the first, third, fourth, and sixth drive gears on the first and second input shafts are selectively changed and output.

6. The double clutch transmission of claim 2, wherein the first, second, third, fourth, and sixth drive gears are disposed in a sequence of the third drive gear, the first drive gear, the fourth drive gear, the second drive gear, and the sixth drive gear.

7. The double clutch transmission of claim 2, wherein:
the first and third drive gears are formed on the first input shaft; and
the second, fourth, and sixth drive gears are formed on the second input shaft.

8. The double clutch transmission of claim 2, wherein the first output device comprises:
the first output shaft;
first, second, third, and fourth driven gears disposed on the first output shaft and respectively engaged with the first, second, third, and fourth drive gears;

a first synchronizing device for selectively transmitting torques of the first and third driven gears to the first output shaft;

a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

9. The double clutch transmission of claim 8, wherein the second output device comprises:

the second output shaft;

fifth and sixth driven gears disposed on the second output shaft and respectively engaged with the third and sixth drive gears;

a first mediating gear engaged with the first drive gear;

a second mediating gear connected to the first mediating gear by an idle shaft;

the reverse driven gear engaged with the second mediating gear and disposed on the second output shaft between the sixth driven gear and the second output gear such that at least some gear teeth of the reverse driven gear are close to an exterior circumference of the second input shaft between the second and fourth drive gears;

a third synchronizing device for selectively transmitting a torque of the fifth driven gear and the sixth driven gear to the second output shaft;

a fourth synchronizing device for selectively transmitting torques of the sixth driven gear and the reverse driven gear to the second output shaft;

the second output gear disposed on the second output shaft and engaged with the differential gear; and the parking gear disposed on the second output shaft at an axial position thereof corresponding to one drive gear on the second input shaft between the reverse driven gear and the second output gear, the parking gear being disengaged from the one drive gear, such that torques of the first, third, and sixth drive gears on the first and second input shafts are selectively changed and output.

10. The double clutch transmission of claim 9, wherein the one drive gear on the second input shaft is the fourth drive gear.

11. The double clutch transmission of claim 2, wherein the first, second, third, fourth, and sixth drive gears are disposed in a sequence of the third drive gear, the first drive gear, the sixth drive gear, the second drive gear, and the fourth drive gear.

12. A double clutch transmission comprising:

a main input shaft for receiving an engine torque;

a first input shaft rotating coaxially with the main input shaft;

a second input shaft rotating coaxially with the main input shaft and about an exterior circumference of the first input shaft;

first and second clutches for selectively transmitting a torque of the main input shaft to the first and second input shafts respectively;

first and third drive gears formed on one input shaft among the first and second input shafts;

second, fourth, and sixth drive gears formed on another input shaft among the first and second input shafts;

a first output device including a first output shaft disposed parallel to and apart from the main input shaft by a predetermined distance and having a plurality of driven gears and a first output gear thereon, such that torques of the first, second, and third drive gears on the first and second input shafts are selectively changed and output;

a second output device including a second output shaft disposed parallel to and apart from the main input shaft by a predetermined distance and having a plurality of driven gears, a second output gear, and a reverse driven gear thereon, such that torques of the first, third, fourth, and sixth drive gears on the first and second input shafts are selectively changed and output;

a differential gear commonly connected to the first output gear and the second output gear; and a parking gear disposed on the first output shaft in a transmission case at an axial position thereof corresponding to one drive gear engaged with one driven gear of the second output shaft.

13. The double clutch transmission of claim 12, wherein:

the first drive gear is used for first and reverse speeds of the transmission;

the second drive gear is used for a second speed of the transmission;

the third drive gear is used for third and fifth speeds of the transmission;

the fourth drive gear is used for fourth speed of the transmission; and the sixth drive gear is used for sixth speed of the transmission and also for an engagement with the parking gear.

14. The double clutch transmission of claim 12, wherein the first output device comprises:

the first output shaft;

first, second, and third driven gears disposed on the first output shaft and respectively engaged with the first, second, and third drive gears;

a first synchronizing device for selectively transmitting torques of the first and third driven gears to the first output shaft;

a second synchronizing device for selectively transmitting a torque of the second driven gear to the first output shaft;

the first output gear disposed on the first output shaft and engaged with the differential gear; and the parking gear disposed on the first output shaft at an axial position thereof corresponding to one drive gear on the second input shaft between the second driven gear and the first output gear, the parking gear being disengaged from the one drive gear, such that torques of the first, second, and third drive gears on the first and second input shafts are selectively changed and output.

15. The double clutch transmission of claim 14, wherein the one drive gear on the second input shaft is the sixth drive gear.

16. The double clutch transmission of claim 12, wherein the second output device comprises:

the second output shaft;

fourth, fifth, and sixth driven gears disposed on the second output shaft and respectively engaged with the fourth, third, and sixth drive gears;

a first mediating gear engaged with the first drive gear;

a second mediating gear connected to the first mediating gear by an idle shaft;

the reverse driven gear engaged with the second mediating gear and disposed on the second output shaft between the first mediating gear and fourth driven gear such that at least some gear teeth of the reverse driven gear are close to an exterior circumference of the second input shaft between the first and fourth drive gears;

a third synchronizing device for selectively transmitting torques of the fifth driven gear and the reverse driven gear to the second output shaft;

a fourth synchronizing device for selectively transmitting torques of the fourth driven gear and the sixth driven gear to the second output shaft; and the second output gear disposed on the second output shaft and engaged with the differential gear, such that torques of the first, third, fourth, and sixth drive gears on the first and second input shafts are selectively changed and output.

17. The double clutch transmission of claim 12, wherein the first, second, third, fourth, and sixth drive gears are disposed in a sequence of the third drive gear, the first drive gear, the fourth drive gear, the second drive gear, and the sixth drive gear.

18. A double clutch transmission comprising:

a main input shaft for receiving an engine torque;

a first input shaft rotating coaxially with the main input shaft;

a second input shaft rotating coaxially with the main input shaft and about an exterior circumference of the first input shaft;

first and second clutches for selectively transmitting a torque of the main input shaft to the first and second input shafts respectively;

first and third drive gears formed on one input shaft among the first and second input shafts;

second, fourth, and sixth drive gears formed on another input shaft among the first and second input shafts;

a first output device including a first output shaft disposed parallel to and apart from the main input shaft by a predetermined distance and having a plurality of driven gears and a first output gear thereon, such that torques of the first, second, third, and fourth drive gears on the first and second input shafts are selectively changed and output;

a second output device including a second output shaft disposed parallel to and apart from the main input shaft by a predetermined distance and having a plurality of driven gears, a second output gear, and a reverse driven gear thereon, such that torques of the first, third, and sixth drive gears on the first and second input shafts are selectively changed and output;

a differential gear commonly connected to the first output gear and the second output gear; and a parking gear disposed on the second output shaft in a transmission case at an axial position thereof corresponding to one drive gear engaged with one driven gear of the first output shaft.

19. The double clutch transmission of claim 18, wherein:

the first drive gear is used for first and reverse speeds of the transmission;

the second drive gear is used for a second speed of the transmission;

the third drive gear is used for third and fifth speeds of the transmission;

the fourth drive gear is used for a fourth speed of the transmission and also for an engagement with the parking gear; and the sixth drive gear is used for a sixth speed of the transmission.

20. The double clutch transmission of claim 18, wherein the first output device comprises:

the first output shaft;

first, second, third, and fourth driven gears disposed on the first output shaft and respectively engaged with the first, second, third, and fourth drive gears;

a first synchronizing device for selectively transmitting torques of the first and third driven gears to the first output shaft;

a second synchronizing device for selectively transmitting torques of the second and fourth driven gears to the first output shaft; and the first output gear disposed on the first output shaft and engaged with the differential gear, such that torques of the first, second, third, and fourth drive gears on the first and second input shafts are selectively changed and output.

21. The double clutch transmission of claim 18, Wherein the second output device comprises:

the second output shaft;

fifth and sixth driven gears disposed on the second output shaft and respectively engaged with the third and sixth drive gears;

a first mediating gear engaged with the first drive gear;

a second mediating gear connected to the first mediating gear by an idle shaft;

the reverse driven gear engaged with the second mediating gear and disposed on the second output shaft between the sixth driven gear and the second output gear such that at lest some gear teeth of the reverse driven gear are close to an exterior circumference of the second input shaft between the second and fourth drive gears;

a third synchronizing device for selectively transmitting a torque of the fifth driven gear and the sixth driven gear to the second output shaft;

a fourth synchronizing device for selectively transmitting torques of the sixth driven gear and the reverse driven gear to the second output shaft;

the second output gear disposed on the second output shaft and engaged with the differential gear; and the parking gear disposed on the second output shaft at an axial position thereof corresponding to one drive gear on the second input shaft between the reverse driven gear and the second output gear, the parking gear being disengaged from the one drive gear, such that torques of the first, third, and sixth drive gears on the first and second input shafts are selectively changed and output.

22. The double clutch transmission of claim 21, wherein the one drive gear on the second input shaft is the fourth drive gear.

23. The double clutch transmission of claim 18, wherein the first, second, third, fourth, and sixth drive gears are disposed in a sequence of the third drive gear, the first drive gear, the sixth drive gear, the second drive gear, and the fourth drive gear.

* * * * *